United States Patent
Wulff et al.

(10) Patent No.: US 7,080,787 B2
(45) Date of Patent: Jul. 25, 2006

(54) INSERT MOLDED ANTENNA

(75) Inventors: Thomas Wulff, North Patchogue, NY (US); Ron Zancola, Commack, NY (US)

(73) Assignee: Symbol Technologies, Inc., Holtsville, NY (US)

(*) Notice: Subject to any disclaimer, the term of this patent is extended or adjusted under 35 U.S.C. 154(b) by 41 days.

(21) Appl. No.: 10/613,441

(22) Filed: Jul. 3, 2003

(65) Prior Publication Data
US 2005/0001767 A1    Jan. 6, 2005

(51) Int. Cl.
G06K 7/10    (2006.01)
(52) U.S. Cl. .............................. 235/462.45; 235/472.01
(58) Field of Classification Search ..............................
235/462.01–462.47, 472.01, 472.02, 472.03, 235/454, 455, 494, 470
See application file for complete search history.

(56) References Cited

U.S. PATENT DOCUMENTS

| | | | | |
|---|---|---|---|---|
| 5,198,651 A | * | 3/1993 | Barkan et al. | 235/462.43 |
| 5,689,104 A | * | 11/1997 | Suzuki et al. | 235/462.09 |
| 5,979,763 A | * | 11/1999 | Wang et al. | 235/462.17 |
| 6,172,620 B1 | * | 1/2001 | Brick et al. | 341/22 |
| 6,431,451 B1 | * | 8/2002 | Koenck et al. | 235/472.01 |
| 2003/0234291 A1 | * | 12/2003 | Wulff et al. | 235/462.48 |
| 2004/0050937 A1 | * | 3/2004 | Barkan | 235/462.36 |
| 2005/0092841 A1 | * | 5/2005 | Barkan | 235/462.25 |
| 2005/0224585 A1 | * | 10/2005 | Durrant et al. | 235/492 |

* cited by examiner

*Primary Examiner*—Thien M. Le
(74) *Attorney, Agent, or Firm*—Amin & Turocy, LLP

(57) ABSTRACT

Systems and methods are disclosed for insert-molding various electronic and mechanical parts as part of a housing of an electrical device. The insert molded components can comprise antennas, flex members and circuits, electronic, mechanical, and interface units that have been insert molded as part of a plastic housing that contains the electrical device.

12 Claims, 11 Drawing Sheets

OUTER BRANCH
ASSEMBLY

INNER BRANCH
ASSEMBLY

Sectional View A-A

INSERT MOLDED ANTENNA

FIELD OF THE INVENTION

The present invention relates to systems and methods of insert-molded components as part of a housing compartment and in particular to electronic and mechanical parts, (e.g. antenna, flex members, electrical components), insert-molded into and/or as part of a plastic housing of an electrical device.

BACKGROUND OF THE INVENTION

Typically there is a desire to reduce size of electronic units, while lowering associated assembly costs and improving overall ruggedness. In particular, many electronic units such as hand hold mobile terminals, communication units, and the like have various assembly costs and are generally susceptible to damage during employment in harsh environments. Such units are generally assembled by enclosing internal electrical components, such as a central processing unit (CPU) board, display, keyboard, and internal wiring, within a housing made of plastic or another structural material. The enclosure normally serves as a protective measure and is typically formed in two parts having an upper housing and a lower housing. The electronic components can be mounted to one or both sides of the housing. Many such electronic units employ antennas structures, flexural connection units and other mechanical and electrical components as part of their operative assembly.

Antenna structures for such units have typically manifested themselves as protuberances and often as extendable metallic projections out of the electronic equipment which they service. Such components, while essential for transmitting and receiving electromagnetic propagable electromagnetic waves, have generally been both cumbersome and aesthetically undesirable. At the same time, they are typically susceptible to damage when the associated unit is being employed in harsh environments.

Because there are various types of communication systems, such as GSM, DCS, PCS, DAMPS and others, it increasingly likely to have different types of systems serving a common area. These systems generally operate at various frequency ranges, e.g., GSM typically operates at 890–960 MHz and DCS typically operates at 1710–1880 MHz. As such, it is becoming desirable to introduce any of a number of functions such as, data link, wireless units, and the like to a communication unit. Thus, antenna configuration and design also plays an important role in feasibility of application for a unit.

While it is essential for effective antenna configurations to assume a dimension proportional to the wavelength of the carrier signal, little progress has taken place in attending to minimization of space occupied by antenna structures and other electronic or mechanical equipments, while simultaneously increasing the overall ruggedness and decreasing assembly costs for the associated electronic unit. Some electronic designers have resorted to merely placing the antenna in a space encapsulated by the housing. For example, one approach for reducing the obvious nature of antenna structures has been to fabricate the radiating elements of antenna structures onto printed circuit boards and "snap" the printed circuit boards into the electronic device, which is encased by the housing. However, such an arrangement is typically susceptible to damage during operation in harsh environments. For instance, an accidental drop of the unit can relocate the antenna from its static position and affect performance of the unit. Moreover, in some applications the snap latch features generally required for such assemblies can pose problems. For example, the snap retention features may require space, and for a unit having closely spaced terminals, the retention geometry can become a problem. The snap retention features can also leave open passages between the front and back of an associated connector. These open passages may be required to become sealed for certain applications, thus increasing associated costs. Accordingly, while such "integration" results in less obtrusive antenna-laden equipment, such advances have not generally attempted to address the manufacturing and structural needs for an ever increasing trend toward integration and miniaturization of electronics.

Meanwhile, progress in spectrum allocations of higher frequency ranges, permits antenna structures to derive benefit from the reduced wavelength of such high frequency signals. In other words, as electronic devices employ higher frequency spectrums, the associated wavelength that dictates the effective length of antenna structures, decreases, which in turn can lead to smaller form-factors for devices employing such antenna structures. This generally enables various communication units to assume desirable integrated and miniaturized configurations.

Similar desire for integration exists for other components associated with an electronic device and its protective plastic housing. Typically, assembly of the components into the housing may require several manufacturing processes. Before the housing is fastened together, the CPU board, the display and other components must be assembled to a subframe, to the housing, or to some other subassembly. Such assembly steps are generally time consuming and expensive in manufacturing. Moreover, in some units the housing enclosure is further attached to a circuit board via connecting members such as flex units. These flex units, as separate components from the housing, are typically thin films of conductors and plastic with curved regions employed for interconnect procedures. Because of constant and on going contact with these flex units during assembly operations, the flex units are generally broken during fabrication and are thus susceptible to breakage. This susceptibility to damage and the associated secondary assembly costs also remains a problem area for other components such as subframes, various electronic circuit boards, display units, interface components, connection terminals, keypads and the like, which are assembled as part of the electronic unit and encased by the plastic housing.

Therefore, there is a need to overcome the aforementioned deficiencies associated with conventional devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The subject invention provides for an apparatus and method for insert-molding various electronic and mechanical parts as part of a housing of an electrical device. Such insert-molded parts are typically capable of withstanding various insert-molding process requirements, such as temperature and pressure.

One aspect of the subject invention provides for an apparatus and method for insert-molding an antenna as part of a housing compartment of a portable communication module. The antenna can be clamped into a molding tool such that the bonding areas of the antenna remain exposed. Such bonding areas provide for a direct bond between the antenna and the resin that is subsequently injected into the molding tool. Typically, the molding tool can comprise a mold surface that forms a cavity having a pre-selected volume with an opening at the mold surface. To facilitate the injection molding process, the clamped position of the antenna can be in a plane substantially parallel to a surface of the molding tool. However, other planar and non-planar orientations for the antenna can also be employed.

According to another particular aspect of the invention, molten resin can be injected into the cavity via a rate sufficient to maintain an unbroken melt front and to avoid any spraying or splashing of the plastic material within the mold cavity. The injection pressure can be monitored and controlled until the mold cavity has been filled, at which time the injection pressure is maintained until the plastic material has hardened around the antenna within the mold cavity. Next, the molded form of the housing compartment with the antenna bonded thereto is taken out by opening the mold assembly or ejected via an ejection mechanism.

The antenna can include additional bonding posts and pins as to improve bonds formed between the antenna and injected resin. In one aspect according to the present invention, the antenna to be insert-molded further comprises interconnect pins and electrical connections employed for subsequent wire bonding and coupling of the antenna to the electronic device.

This subject invention facilitates optimizing antenna geometry and aperture, compared to prior art devices in which such optimization is constrained based on the limited amount of ground plane size. Moreover, electronic devices manufactured by employing insert-molded antenna of the present invention are sized smaller than prior art modules. Also, insert-molding the antenna according to the present invention obviates additional secondary assembly operations, while providing a configuration for the antenna that reduces its damage susceptibility during application in harsh environments.

In another aspect of the invention an electronic flex circuit piece is insert-molded onto a housing compartment. Such flex piece can be laid on a trough of a molded housing compartment and over molded thereupon. Alternatively, the housing and the flex can be molded in one stage. The wide flex radius provided on the flex piece allows for a range of flexural bending and twisting along the edges of the housing without breakage of the flex piece. As such, the flex member can be aligned and accepted with improved connectivity for subsequent attachment via openings in a circuit board or other components adapted for receiving the housing. This further mitigates rupture of flex components during assembly operation. In addition, a housing fabricated with such flexes facilitates any required sealing and provides improved electrostatic discharge protection for the electronic device.

Another aspect of the subject invention provides for interface components being insert-molded with the housing compartment. These devices can include various arrangements for key pads, mice, stylus, or microphones, computer screens, terminals, and the like. Accordingly, the invention obviates a need for manual steps in bonding the circuit components encased by the housing to one another. Put differently, the electrical connection terminals on a device board advantageously can be located to align automatically with the device pins insert-molded within the housing. Also, various communication ports, including switches, plugs and socket arrangements can be insert-molded as part of the plastic housing. The communication ports can be subsequently employed for any suitable communication interface for communication standards and/or protocols, e.g., parallel, SCSI, Firewire (IEEE 1394), Ethernet, etc.

Also, because virtually the entire body of the housing can be plastic, the individual power pins and interconnects can be located in close proximity, since plastic of the housing and insert-mold provide a higher dielectric insulation as compared to the more conventional use of air as a dielectric insulator. Other aspects of the present invention provide for insert-molding, within the housing, of various electronic components that are capable of withstanding the molding process.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings. To facilitate the reading of the drawings, some of the drawings may not have been drawn to scale from one figure to another or within a given figure.

DETAILED DESCRIPTION OF THE INVENTION

The various aspects of the present invention will now be described with reference to the drawings. The invention provides for an apparatus and method for insert-molding various electronic and mechanical parts as part of a housing of an electrical device. The insert-molded parts can be any component amenable to holding up during various insert-molding process steps. Examples of such insert-molding components can include, various type of antennas, flexural members associated with connections, various input/out put devices such as key pad arrangements, circuit boards and the like.

Figure 1:
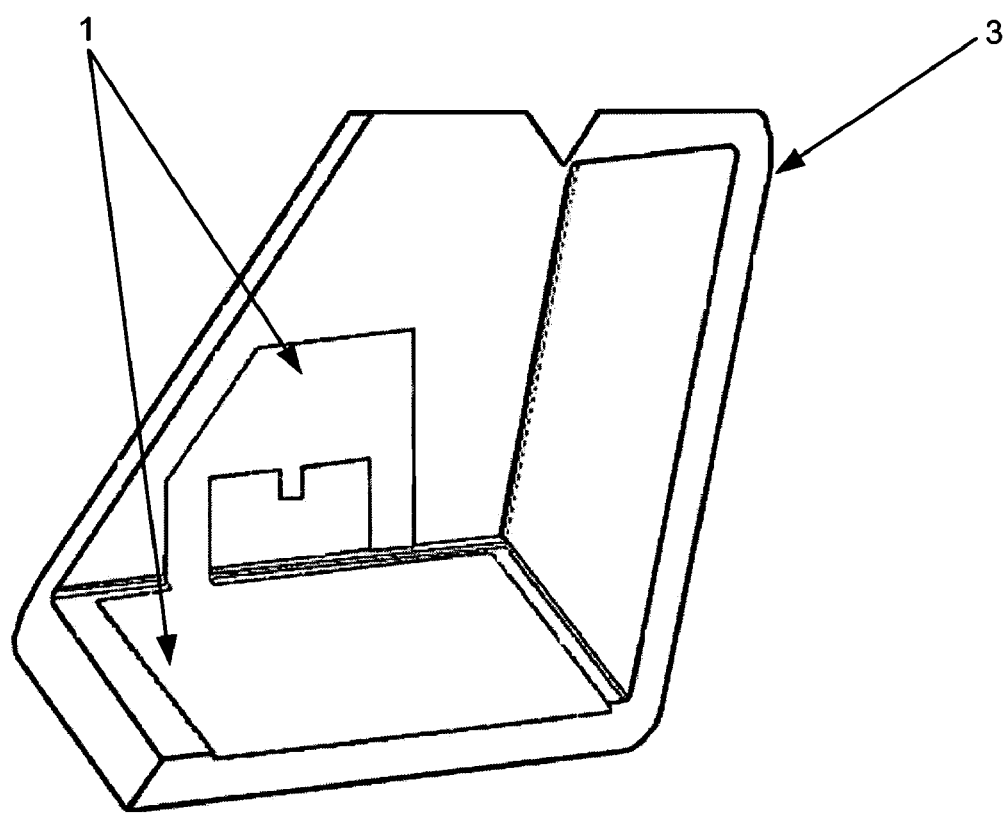
FIG. 1 illustrate a fragmentary perspective view showing an antenna insert-molded as part of a plastic housing according to one aspect of the present invention.

Referring initially to FIG. 1 a fragmentary perspective view is illustrated that shows an exemplary aspect of the present invention. An antenna 1 is being insert-molded as part of a portion 3 of a housing. The housing can be applied for containment of an electronic device, such as devices employed in numerous types of commercial and industrial applications, (e.g., computers, personal digital assistants, cameras, electronic games, hand held mobile device, communication units and the like) which are typically assembled by enclosing internal electrical components, such as a Central Processing Unit (CPU) board, display, and internal wiring, within the housing. Typically, materials employed for fabricating the housing can include various types of thermoset and thermoformed plastic or the like.

The electronic components can also be mounted to one or both sides of the housing with or without a subframe. The housing may further comprises various portions (e.g. an upper half and a lower half) being interconnected via a fastening mechanism as to encapsulate the electronic device, or for connection to a circuit board. Moreover, various gaskets (not shown) can be provided along a perimeter of the housing for any opening (e.g. a display, interconnect point, and the like) to mitigate contamination, which might otherwise enter the electronic device assembly from outside and thus affect performance of the unit. The gaskets can be of rubber, foam, or any other elastomer, operable to sufficiently seal the assembly of the mobile terminal.

Referring now to FIG. 2a–FIG. 2d, various forms and structural configurations of antenna 1 is illustrated, which can include planar or three dimensional profiles with controlled shaping and pointing of the antenna's directivity pattern. The antenna 1 can also be part of a phased array antenna subsystems that employs a distribution of three-dimensionally shaped antenna elements, such as helical antenna elements wound on low loss foam cores. Moreover, according to one aspect of the present invention, antenna 1 can employ a section of a thin, lightweight flex circuit decal, rather than a wire, as the antenna's radiating element. The flex circuit can be attached to a support core that conforms with the intended (e.g. three-dimensional) shape of the antenna, as to support and contour the flex circuit decal in its intended three-dimensional shape. The signal coupling interface for the antenna 1 can then be formed by electromagnetically coupling of a section of transmission line to the flex circuit.

Figure 2A:
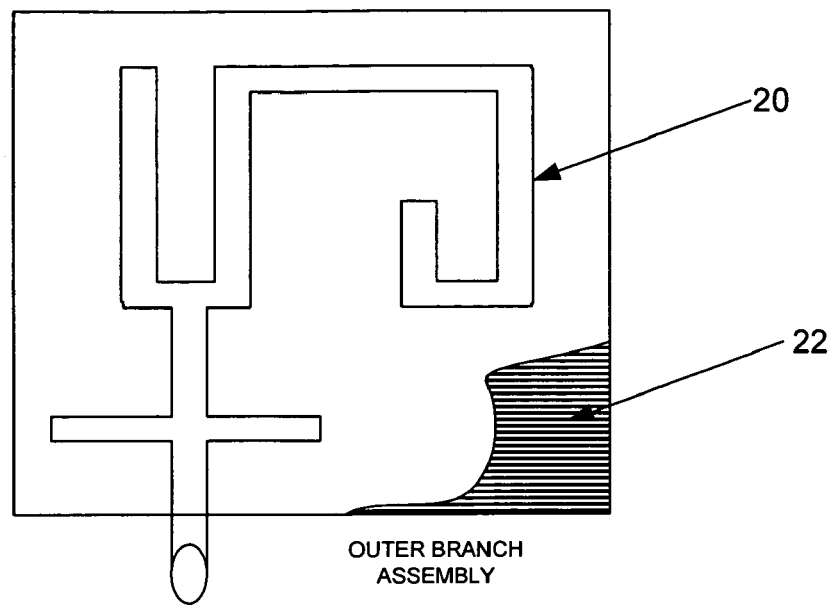
FIGS. 2a–2d illustrate various antenna structures according to one or more aspects of the present invention.
Figure 2B:
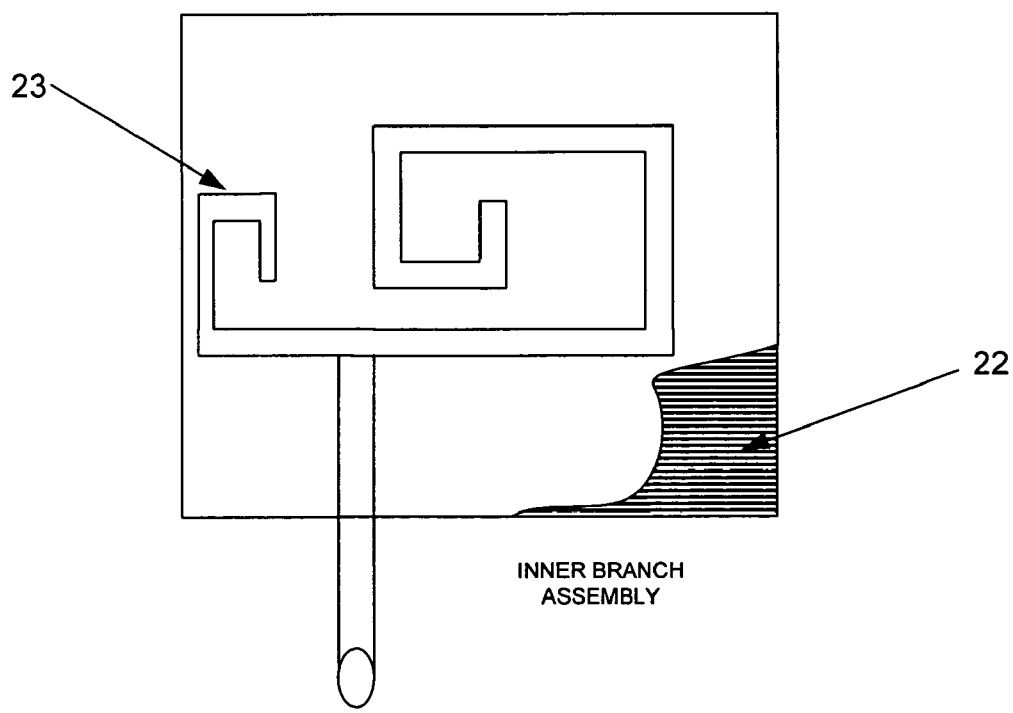

Other exemplary embodiments of the antenna 1 are further illustrated in FIG. 2(a), FIG. 2(b), which depicts multiple band antenna with multiple branches. In one aspect of the present invention, an antenna branch 20 can have a length and geometry pre-selected to resonate in a particular frequency band. As compared to a typical dual band helical antenna, the multiple branch antenna as depicted in FIG. 2a and FIG. 2b provide further design flexibility. The dual resonances of a typical dual band helical antenna are achieved by changing pitch angle or other helical parameters. Because the resonant frequencies in a helical antenna will also be dependent upon the mechanical tolerances of the helical parameters, the multiple branch antenna as depicted in FIG. 2a and FIG. 2b provide a significant advantage. The printed multiple branch antenna insert-molded as part of the plastic housing according to the present invention significantly reduces the likelihood of mechanical tolerance problems because the height of the antenna can be easily adjusted by changing the strip line pattern or dimensions.

Moreover, each branch 20 can be formed by a flexible film which has a meandering, outer spiral or inner spiral strip line pattern formed thereon and which is formed into a desired shape. In one exemplary aspect, the antenna branch is comprised of a relatively thin, flexible dielectric film 22 and a strip antenna formed by a meandering metal line 23.

The meandering metal line 23 can be varied between the antenna branches such that the different antenna branches are resonant at different frequencies. Thus, multiple resonances in multiple branches can be achieved by selecting appropriate strip dimensions and patterns for each branch. It will be appreciated by one skilled in the art that a variety of different patterns for the metal strips could be selected in order to achieve the desired resonances. FIG. 2(a) and FIG. 2(b) illustrate two such alternative patterns.

In FIG. 2(a), the strip antenna is formed by an outer spiral metal line 20. As with the meandering metal line, the outer spiral metal line 20 is preferably varied between the antenna branches such that the different antenna branches are resonant at different frequencies. As an alternative to the outer spiral pattern illustrated in FIG. 2(a), the strip antenna may be formed by an inner spiral metal line 23 as is illustrated in FIG. 2(b). While the set of metal lines illustrated in FIG. 2(a) and FIG. 2(b) are both either meandering, outer spiral or inner spiral in shape, one skilled in the art will appreciate that a combination of shapes may also be employed. For example, one of the metal lines may be of a meandering shape while the other is of an inner or outer spiral shape. The selection of a particular shape depends on antenna design considerations. For example, where less interference is desirable, the outer spiral shape should be selected. Similarly, where it is desirable for the coupling between the lower and higher bands to be more separated, the inner spiral shape can be selected. The metal line can be formed by printing, etching, or any other suitable method.

Figure 2C:
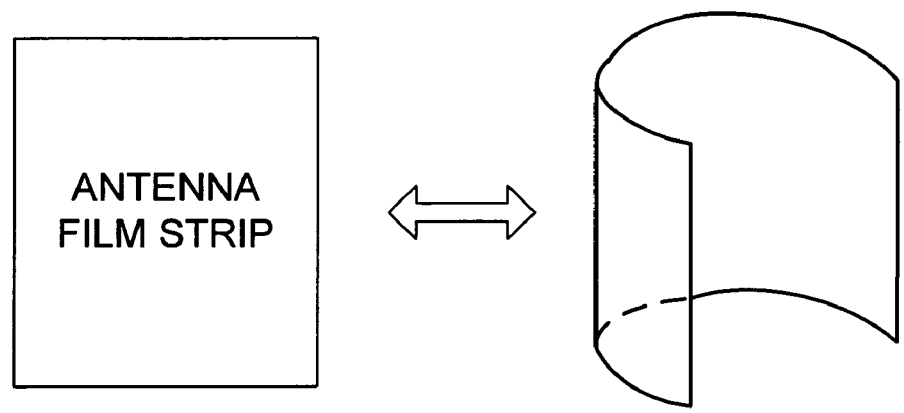

As shown in FIG. 2c, because the film is a flexible material, the printed film can be rolled into a generally cylindrical (e.g. 24 mm in length and approximately 8 mm in diameter) for use as an antenna component and insert-molded at a desired configuration within the plastic housing. Such a cylinder configuration could be partially open or completely closed depending upon antenna design considerations. For example, the bandwidth of the antenna can be varied by varying the diameter of the cylinder. Of course, it should be appreciated that the antenna branches can be formed in shapes other than a cylinder, and different branches can have different geometries (for example, circular, polygon, elliptical), depending upon design considerations. The metal lines 22, 23 can also be etched directly onto a dielectric cylinder. The use of different geometries and manufacturing methods allow for increased design freedom.

Figure 2D:
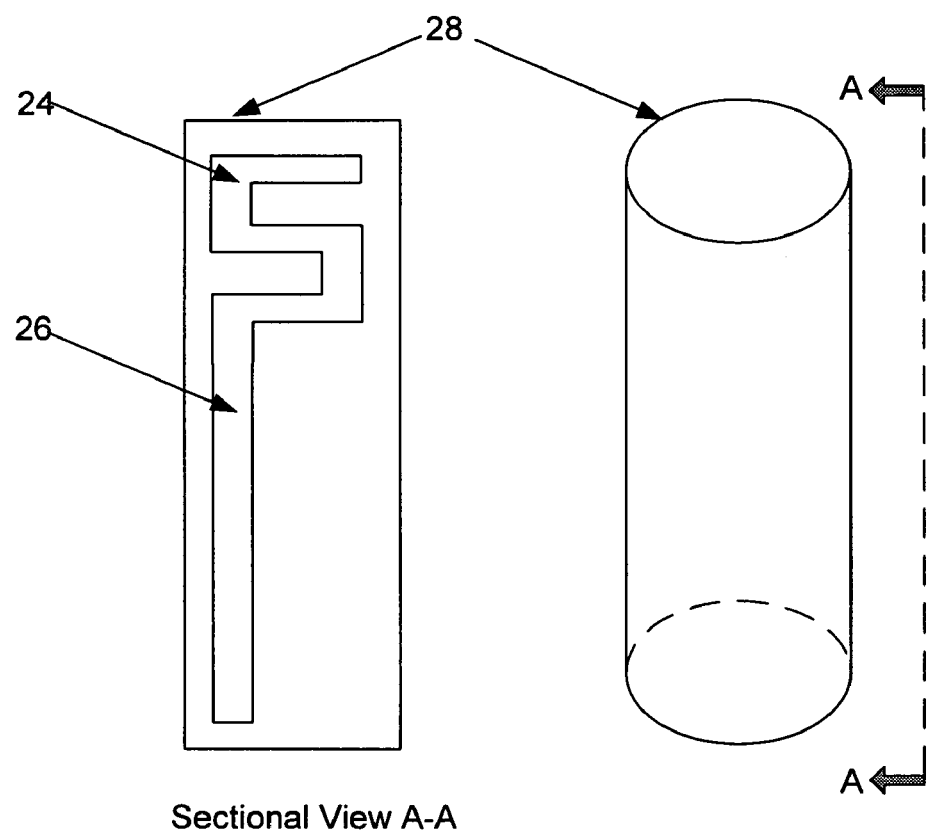

Referring now to FIG. 2d, another exemplary illustration of the insert-molded antenna is depicted. The antenna 1 can comprise an integrally stamped thin metal conductor to function as a frequency-control structure of the antenna. An upper end of the stamped thin metal conductor can be a curled wave coil 24, and a lower end being an elongated contact head 26. The curled wave coil can includes horizontal and vertical wave segments adapted to two different frequencies of 900 MHz and 1800 MHz, respectively. A cover 28 encloses the curved wave coil to protect the coil against impact and deformation during the insert-molding process.

Figure 3:
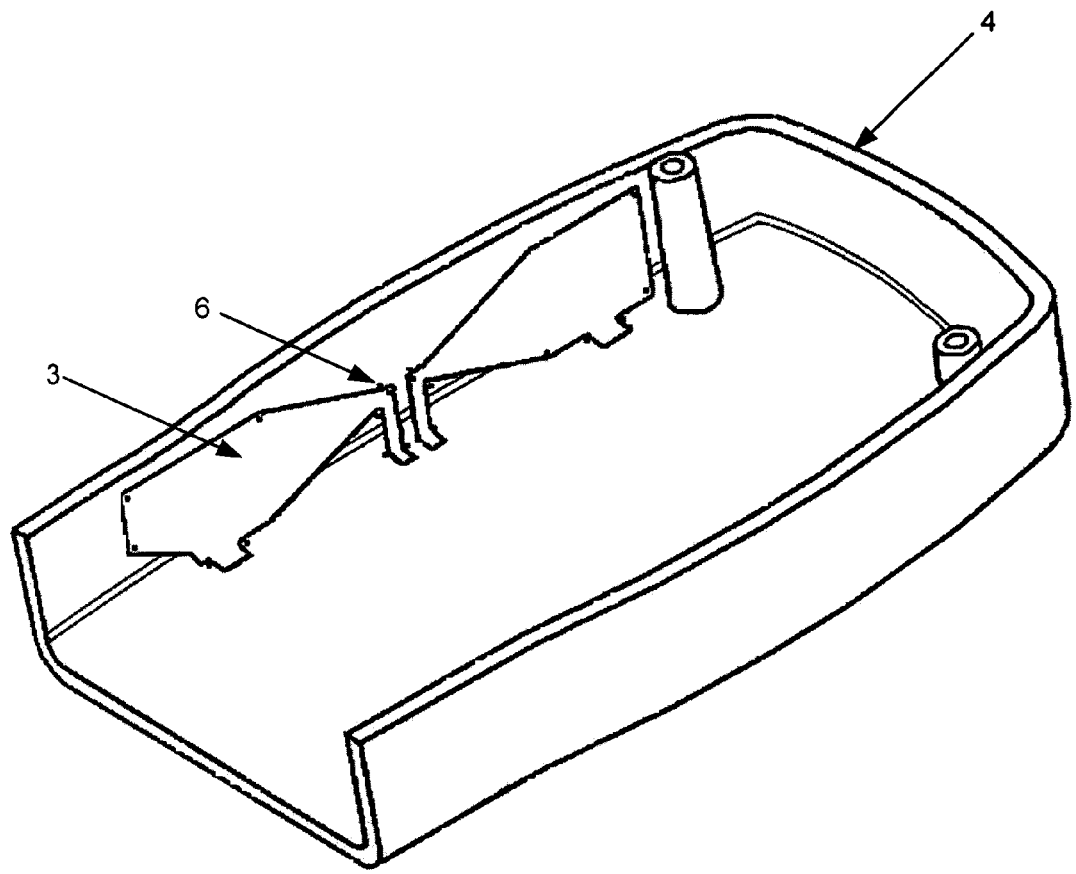
FIG. 3 illustrates an alternative perspective view showing an antenna within a plastic cover of a mobile device according to an aspect of the present invention.

FIG. 3 illustrates an alternative perspective view showing an antenna 3 insert-molded within a lower half plastic cover 4 of a mobile phone according to an aspect of the present invention. The antenna 3 can further include various bonding posts and pins 6 as to improve bonds formed during resin injection between the antenna and the formed housing. Additionally, in accordance with one aspect of the subject invention, the antenna to be insert-molded can further comprise interconnect pins and electrical connections employed for subsequent wire bonding and coupling of the antenna to the electronic device. As such, the employed wire bonding parts are typically constructed of material that can with stand the insert-molding process steps.

Figure 4:
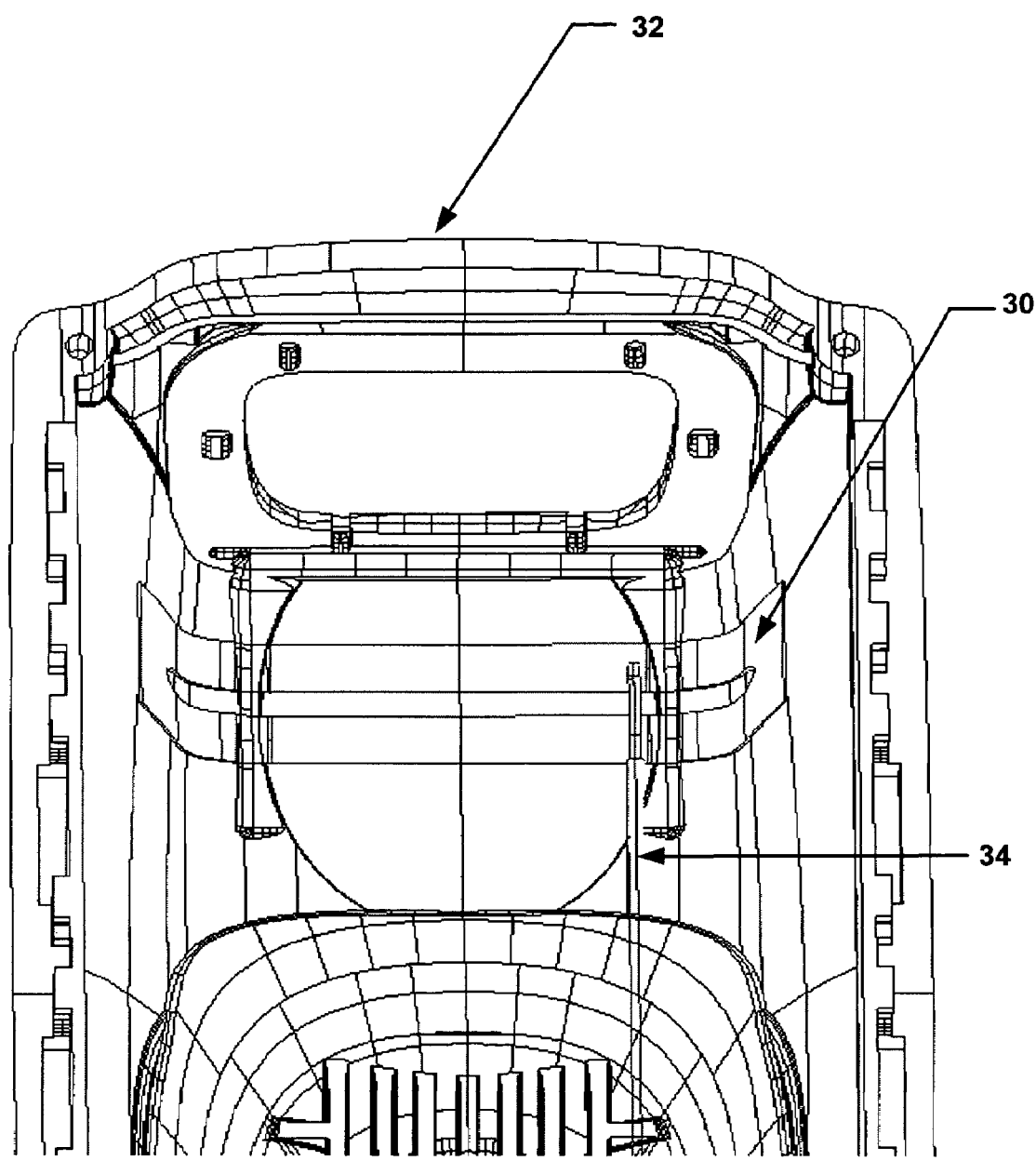
FIG. 4 illustrates a perspective plan view of another aspect of an insert-molded antenna according to the present invention.

An alternative positioning of the insert-molded antenna according to one aspect of the invention is illustrated in FIG. 4. An antenna 30 is insert-molded with the plastic housing 32 of mobile phone unit. The antenna 30 can be a dielectric film or sheet metal with conductive linings as described earlier. A conductive coupling member 34 provides for coupling of the antenna with the electronic device. Such coupling member 34 can also be insert-molded in to the plastic housing simultaneously with the insert-molding of antenna 30. As such, various secondary assembly costs can be reduced. Moreover, since the antenna is encased by the plastic housing 32, the antenna is less susceptible to damage during application in harsh environments. Also, with the antenna 30 being insert-molded the size of the mobile phone unit is being reduced to a more compact configuration. Positioning of the insert-molded antenna can be governed by design considerations and molding process requirement. In addition, for a mobile unit, multiple antennas can be insert-molded at several locations of the plastic housing to improve performance potential at multiple orientations. It will be appreciated that a suitable antenna according to the present invention can be designed to operate in two or more bands corresponding to GSM, DCS, PCS, or other frequency bands.

Figure 5:
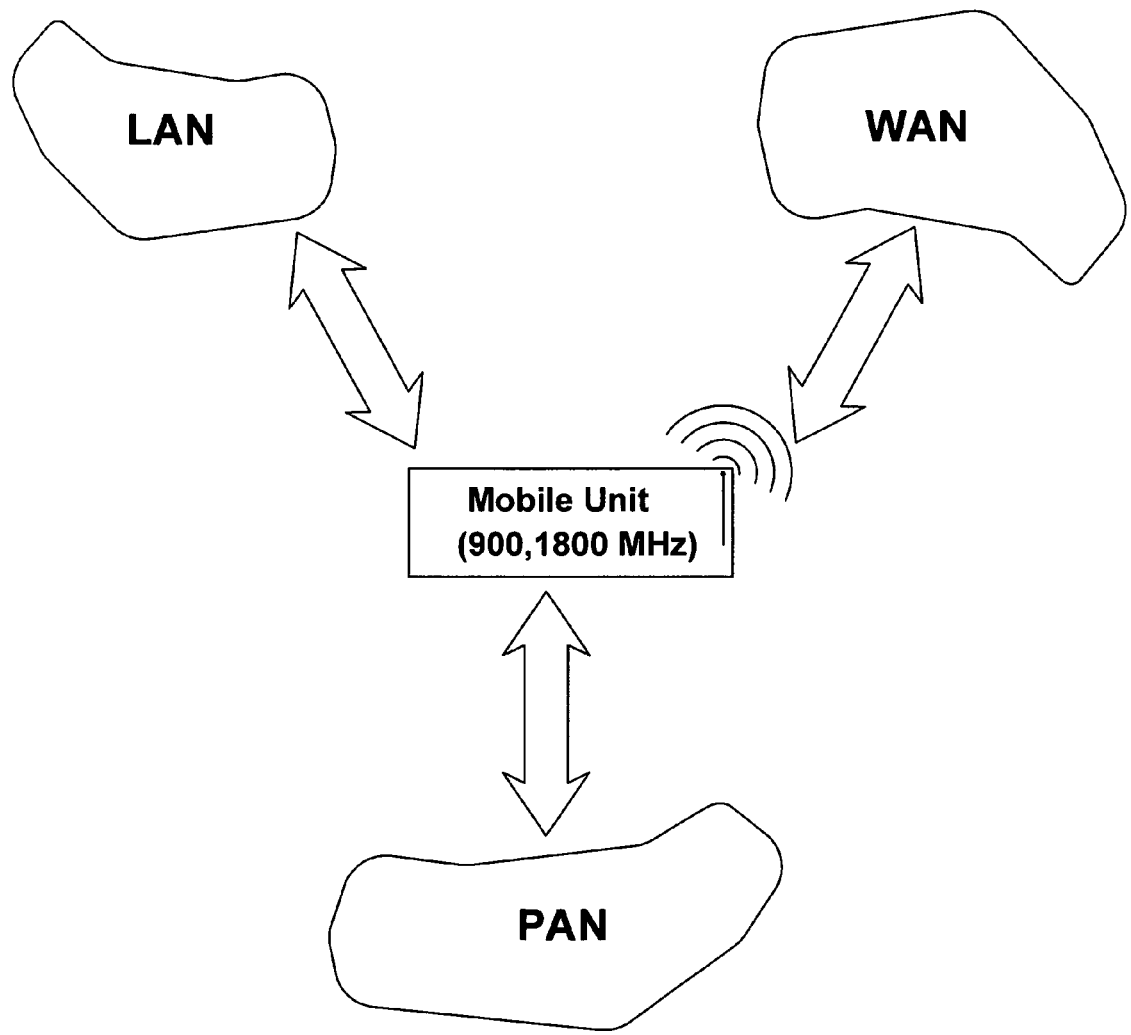
FIG. 5 illustrates a schematic of a portable communication unit in communication with various networks in accordance to an aspect of the present invention.

FIG. 5 illustrates a schematic of operation for a communication module employing an insert-molded antenna according to one aspect of the present invention. In one aspect of the present invention, a communication unit employing antenna 1& 3 can transmit and receive wireless radio-frequency data communication over; a local area network (LAN) a wide area network (WAN), and a personal area network (PAN). The communication unit can further operate on a dual frequency band, e.g. both the 800 MHz (analog AMPS) and 1900 MHz (digital). The invention is not so limited and other frequency ranges and networks may also be employed.

Figure 6A:
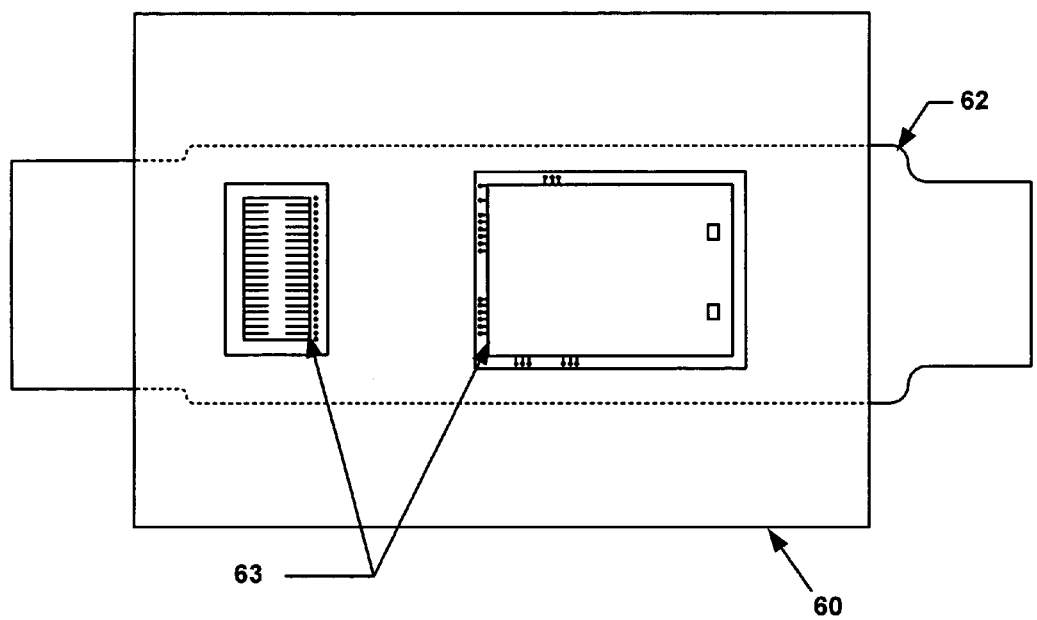
FIGS. 6a and 6b illustrate a plan and side view of the flex member insert-molded with a housing according to an aspect of the present invention.
Figure 6B:
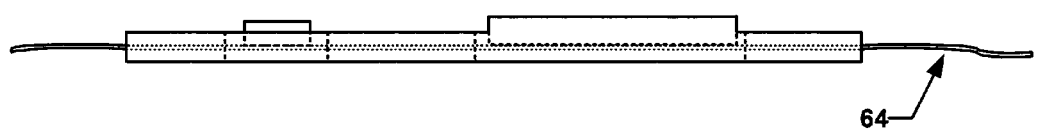

FIGS. 6*a* and 6*b* illustrate a plan and side view of flex member 62 with electronic circuitry 63 insert-molded on to the housing compartment 60 in accordance with an aspect of the present invention. The flex piece 62 is a thin film of conductors and/or plastic employed for interconnect procedures. The flex piece 62 can be laid on a trough of an already fabricated housing compartment and over molded thereupon. Alternatively, in one aspect according to the present invention the housing and the flex can be molded in one stage. The flex piece 62 can be fabricated from material with high deformability features, such as various plastic, rubber, and the like, having a form of a thin film warped and curved at different locations. The wide flex radius 64 provided on the flex piece 62 allows for a range of flexural bending and twisting along the edges of the housing without breakage of the flex piece.

Accordingly, the flex member 62 can be aligned and accepted with improved connectivity for subsequent attachments to openings in a circuit board or other components adapted for receiving the plastic housing 60. This further mitigates rupture of flex components during assembly operation. In addition, a housing fabricated with such flexes facilitates any required sealing and provides improved electrostatic discharge protection for the electronic device.

Figure 7:
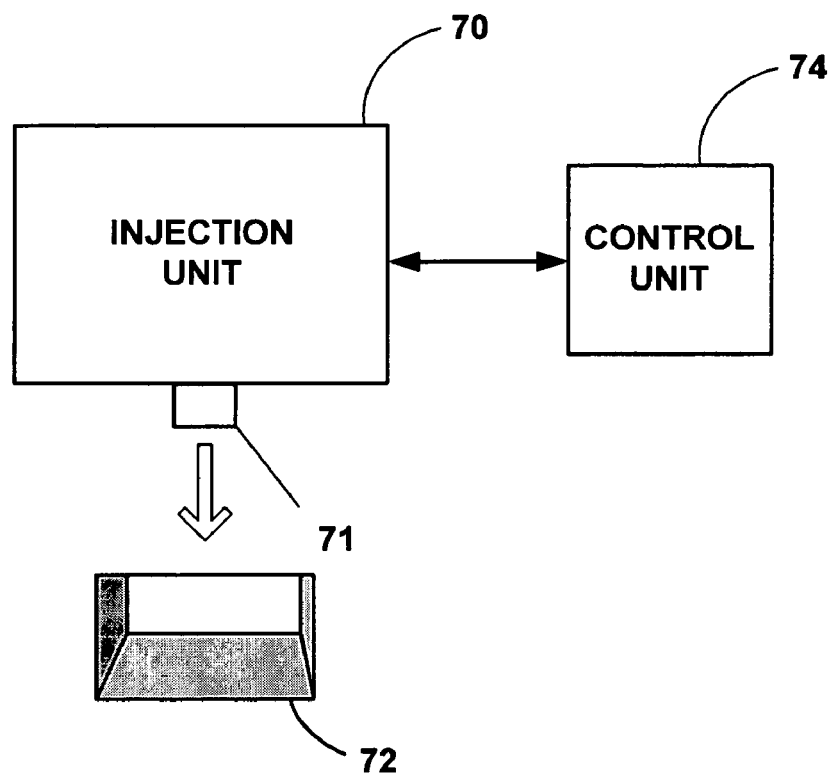
FIG. 7 illustrates a schematic diagram depicting the insert-molding assembly for insert-molding a component in accordance with an aspect of the present invention.

Referring now to FIG. 7, a schematic diagram depicts a system for insert-molding according to one aspect of the present invention. Initially, the injection unit 70 melts the polymer resin and injects the polymer melt into the mold 72. The unit 70 may be ram fed or screw fed. The ram fed injection molding machine uses a hydraulically operated plunger to push the plastic through a heated region. The high viscosity melt is then spread into a thin layer by a "torpedo" to allow for better contact with the heated surfaces. The melt converges at a nozzle 71 and is injected into the mold 72. The reciprocation screw injection molding machine employs a screw that rotates and axially reciprocates. Rotation is produced by a hydraulic motor and acts to melt, mix, and pump the polymer resin. A hydraulic system controls the axial reciprocation of the screw, allowing it to act like a plunger, moving the melt forward for injection. A valve prevents back flow of the melt from the mold cavity.

Next, the polymer flows from the nozzle 71 to the mold 72, which can be coupled to the nozzle 71 by a sprue bushing (not shown). Typically, the injection mold 72 includes two mold halves incorporating thin walled members to define a cavity therebetween. Before injecting plastic material into the cavity 72, the mold can be heated to a temperature above the melting point of the plastic material by circulating a heat carrier flowing through a heating device. During injection of plastic material, the flow of heat carrier is stopped for maintaining the temperature of the mold and for supporting the thin walled members. Molten resin can be injected into the cavity 72 via a rate sufficient to maintain an unbroken melt front and to avoid any spraying or splashing of the plastic material within the mold cavity. The injection process requirements can be regulated via a control unit 74 that includes a CPU. The control unit 74 can control and monitor, for example, the injection pressure until the mold cavity has been filled, at which time the injection pressure is maintained until the plastic material has hardened around the antenna within the mold cavity.

After completely filling the cavity, the mold 72 is cooled down. The insert-molded component can be held in place via employment of a clamp assembly associated with the mold 72. The insert-molding process can be controlled throughout, so that the insert-molded component is not dislocated or damaged.

In a mold with multiple cavities, the melt flows to each cavity by runners and is fed to the cavity through a gate. The gate is simply a restriction in the flow path just ahead of the mold cavity and serves to direct the flow of the melt into the cavity and to limit back flow. The gate can comprise a plurality of gate orifices located near the edges of the mold cavity. These orifices can be located as to allow forwarding resin material into the mold cavity in roughly equal volumes on all free sides of the component being insert-molded with the housing.

In addition, resin injection can be performed via gas assisted injection and non-gas assisted injection. Gas assisted injected mold processing generally comprises two steps. First, viscous thermoplastic is injected through runner conduits and gate conduits into mold cavities. Shortly thereafter gas is injected through the runners and gates to force the thermoplastic against the walls of the mold cavities to form the desired articles. In the case of non gas-assisted injection molding, there is no gas injection step.

Figure 8:
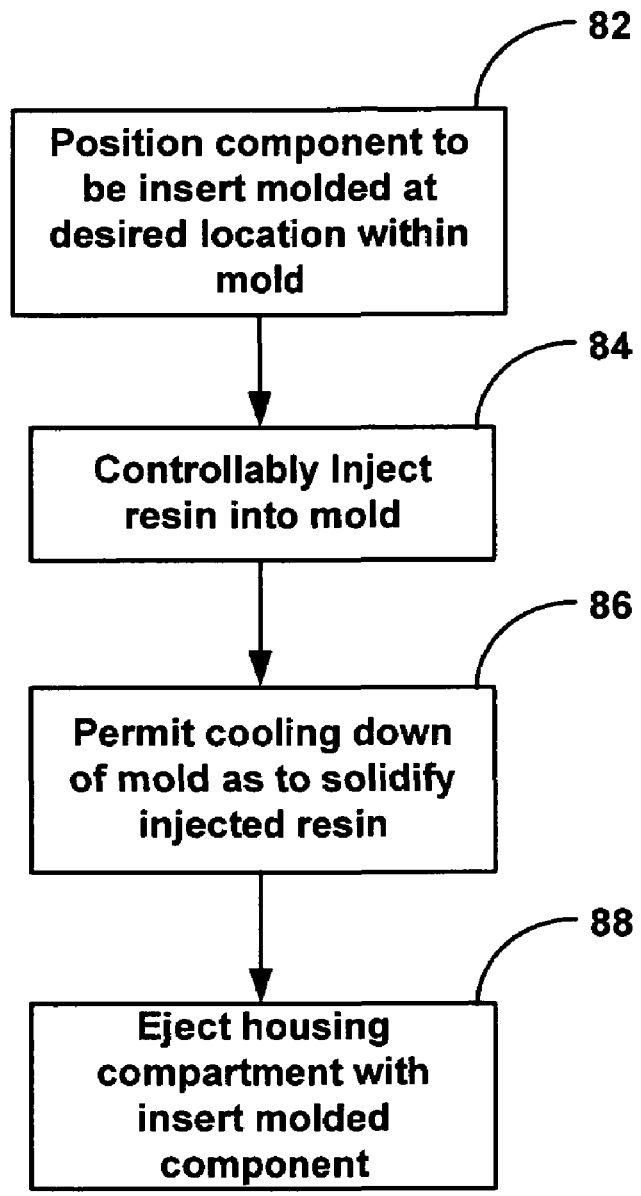
FIG. 8 illustrates a schematic representation of a flow chart for a methodology according to one aspect of the present invention.

Referring now to FIG. 8, a flow chart is illustrated for a methodology of insert-molding a component within a housing of an electronic unit. The method comprises positioning the insert-molded component within the mold at a selected location and injecting a resin material in to the mold. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, any be required to implement a methodology in accordance with the present invention. Moreover, it will be appreciated that the exemplary method and other methods according to the invention may be implemented in association with the insert-molded components illustrated and described herein, as well as in association with other systems and apparatus not illustrated or described.

Beginning at 82, the exemplary method comprises selecting the location of the insert-molded component as part of the housing. The location of insert-molded component may be selected for example, based on the technical and application requirements associated with the particular component. In addition, the location may depend on aesthetic requirements related to appearance of the housing part. The insert-molded component can be placed and kept in position via a clamp assembly of the mold, to minimize any displacement of the insert-molded component during the process. To ameliorate possible damage to the insert-molded component during the injection process, the insert-molded components may also be placed in a protective sheath or casing.

At 84 the resin is controllably injected in to the cavity. The employed resin can comprise various types of thermoset plastic or thermo plastic material such as polybutylene terephthalate, polyethylene terephthalate, polyphenylene sulfide, diallyl phthalate, phenolic resins, and the like. The resin material can be injected into the cavity via a rate sufficient to maintain an unbroken melt front and to avoid any spraying or splashing of the plastic material within the mold cavity. In addition, the injection pressure and temperature can be regulated via a control unit as to moderate susceptibility of damage to the insert-molded component.

The injection pressure can be monitored and controlled until the mold cavity has been filled, at which time the injection pressure is maintained until the plastic material has hardened around the antenna within the mold cavity. At 86 the mold is cooled down as to solidify the injected resin and form the housing compartment with the component insert-molded therein. The cooling can be performed via a circulation system in a time controlled manner. For example, initially, the area most distant to the sprue area can be cooled, and then the cooling gradually progresses from the distant area to the sprue area.

Next, the molded form of the housing compartment with the component bonded thereto is taken out by opening the mold assembly. To facilitate removal of the finished housing compartment, the mold assembly may further comprise an ejector. The above described methods may have to be repeated in various cycles as to fabricate the desired finished housing with insert-molded component.

Another aspect of the subject invention provides for interface components being insert-molded with the housing compartment. These devices can include various arrangements for modular key pads, mice, stylus, or microphones, computer screens, terminals, and the like. These devices typically facilitate manufacturing and service, marketing flexibility, expansion and accessory, and customer reconfiguration. For example, modular keypads insert-molded with a plastic housing of a mobile terminal can be employed to enter identification information concerning the user into the mobile terminal. Additionally, the keypad can be utilized to enter information concerning modes of operation of the mobile terminal or to carry out cancellation or manipulation operations on information provided by the terminal.

Accordingly, various components insert-molded with the plastic housing according to the present invention obviates a need for subsequent manual steps in bonding the circuit components encased by the housing to one another. Put differently, the electrical connection terminals on a device board advantageously can be located to align automatically with the device pins insert-molded within the housing. Various physical communication inter face ports can also be insert-molded as part of the housing. Such interface ports can then be employed as part of a serial communication port and/or in conjunction with other suitable communication standard and/or protocol, e.g., parallel, SCSI, Firewire (IEEE 1394), Ethernet, or the like. Also, because virtually the entire body of the housing can be plastic, any individual power pin and/or interconnects can be located in close proximity, since plastic of the housing and insert-mold provide a higher dielectric insulation as compared to the more conventional use of air as a dielectric insulator.

Figure 9:
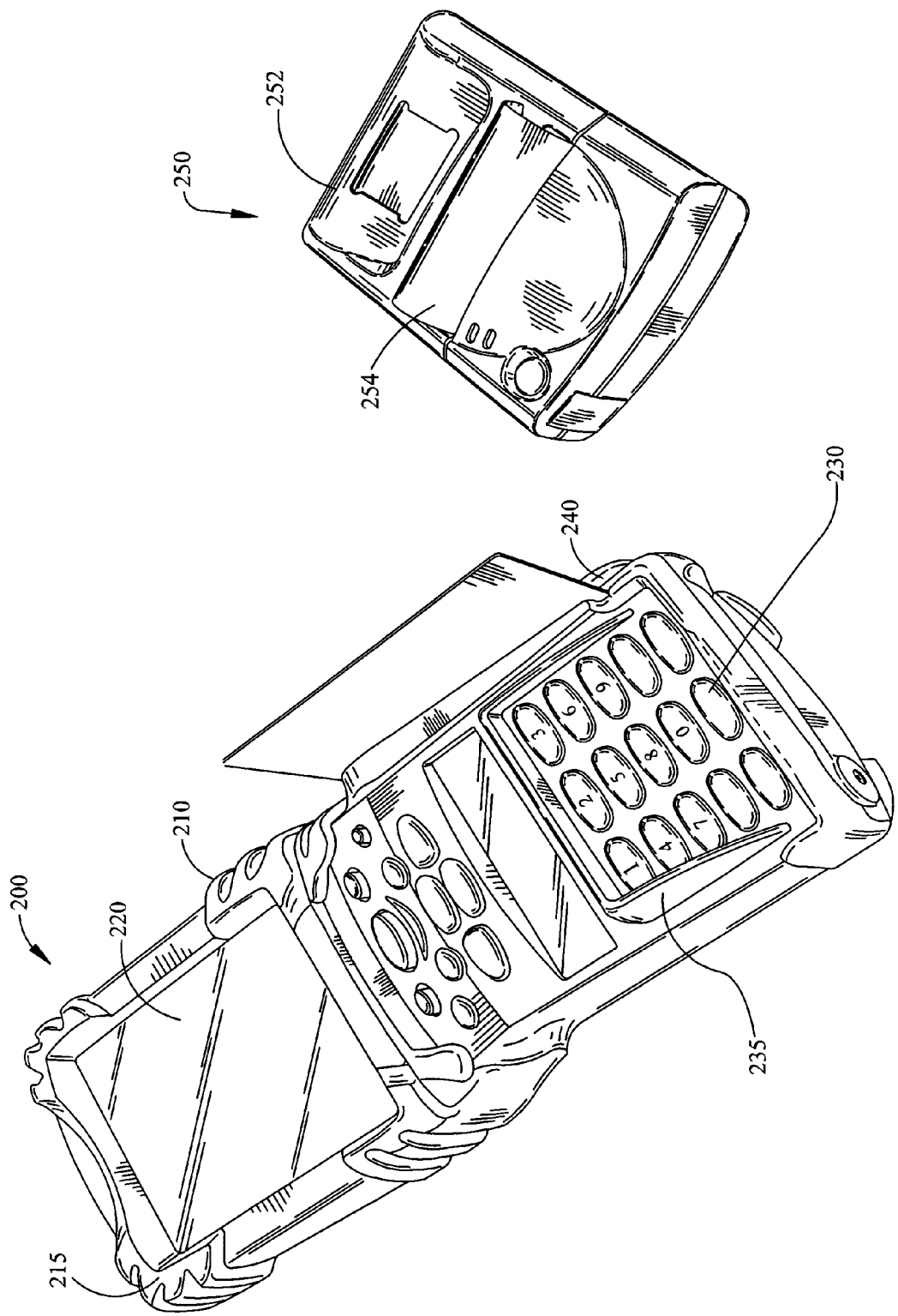
FIG. 9 illustrates one particular type of device in accordance with the subject invention.

FIG. 9 illustrates an example of a handheld terminal 200 in accordance with an aspect of the present invention. The handheld terminal 200 includes a housing 210 which can be constructed from a high strength plastic, metal, or any other suitable material. The handheld terminal 200 includes a display 220. As is conventional, the display 220 functions to display data or other information relating to ordinary operation of the handheld terminal 200 and/or mobile companion (not shown). For example, software operating on the handheld terminal 200 and/or mobile companion may provide for the display of restaurant information, menu information, specials, price information, etc. to a user. Additionally, the display 220 may display a variety of functions that are executable by the handheld terminal 200 and/or one or more mobile companions. The display 220 provides for graphics based alpha-numerical information such as, for example, the price of a menu item. The display 220 also provides for the display of graphics such as icons representative of particular menu items, for example. The display 220 can also be a touch screen, which may employ capacitive, resistive touch, infrared, surface acoustic wave, or grounded acoustic wave technology.

The handheld terminal 200 further includes user input keys 230 for allowing a user to input information and/or operational commands. The user input keys 230 may include a full alphanumeric keypad, function keys, enter keys, etc. The handheld terminal 200 can also include a magnetic strip reader 240 or scanner (not shown). The magnetic strip reader 240 can receive credit card, bank card, etc. information as a customer payment option. An electronic signature apparatus can also be employed in connection with the magnetic strip reader or a telecheck system.

The handheld terminal 200 can also include a window (not shown) in which a bar code reader is able to read a bar code label, or the like, presented to the handheld terminal 200. The handheld terminal 200 can include a LED (not shown) that is illuminated to reflect whether the bar code has been properly or improperly read. Alternatively, or additionally, a sound may be emitted from a speaker (not shown) to alert the user that the bar code has been successfully imaged and decoded. The handheld terminal 200 also includes an antenna (not shown) for wireless communication with an RF access point; and an IR transceiver (not shown) for communication with an IR access point.

Figure 10:
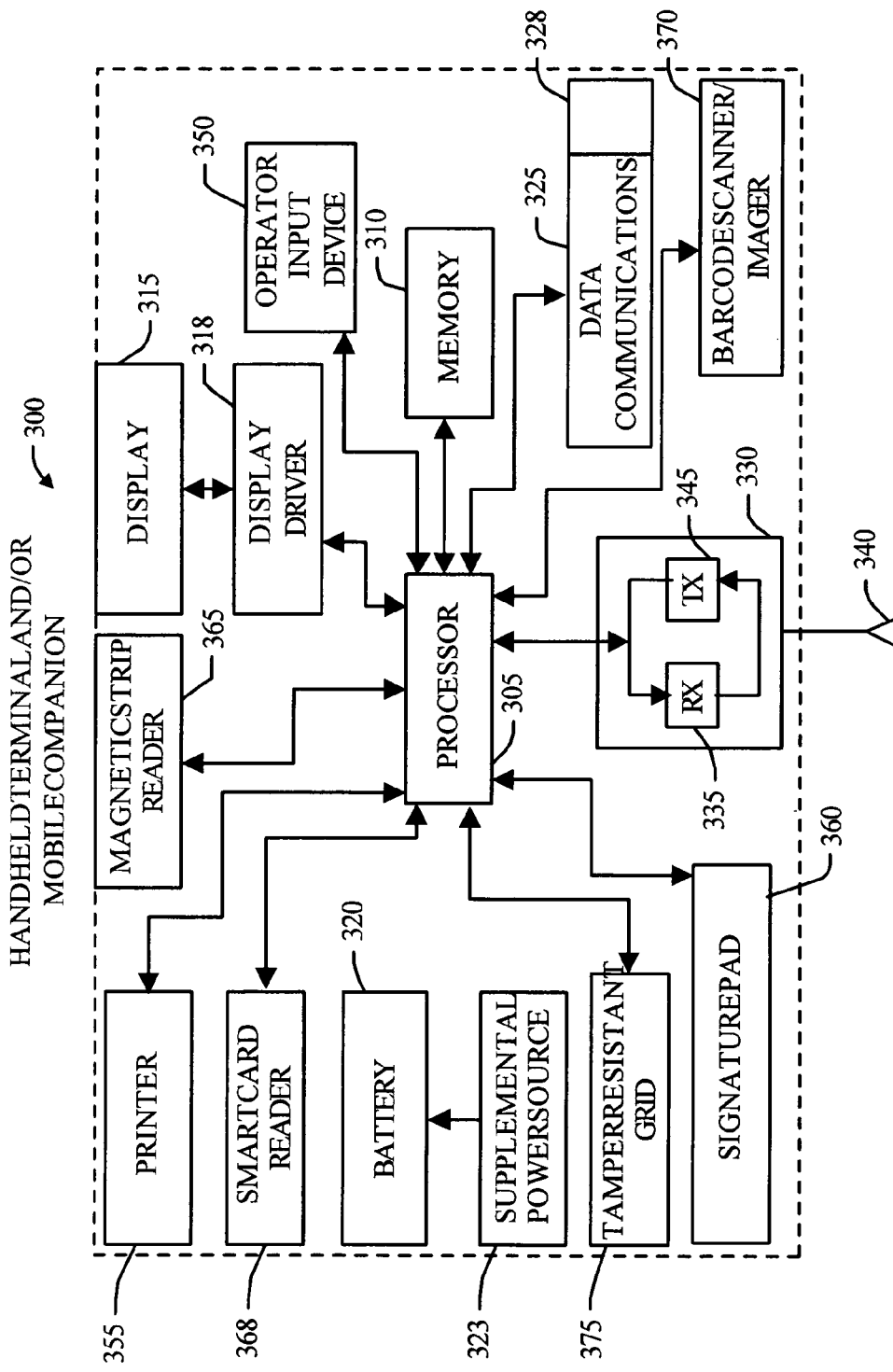
FIG. 10 schematically illustrates one particular type of device architecture in accordance with the subject invention.

Turning now to FIG. 10, a schematic representation according to one aspect of the present invention is shown in which a processor 305 is responsible for controlling the general operation of a handheld terminal and/or mobile companion 300. The processor 305 is programmed to control and operate the various components within the handheld terminal and/or mobile companion 300 in order to carry out the various functions described herein. The processor or CPU 305 can be any of a plurality of suitable processors. The manner in which the processor 305 can be programmed to carry out the functions relating to the present invention will be readily apparent to those having ordinary skill in the art based on the description provided herein.

A memory 310 tied to the processor 305 is also included in the handheld terminal and/or mobile companion 300 and serves to store program code executed by the processor 305 for carrying out operating functions of the handheld terminal and/or mobile companion 300 as described herein. The memory 310 also serves as a storage medium for temporarily storing information such as receipt transaction information and the like. The memory 310 is adapted to store a complete set of the information to be displayed. According to one aspect, the memory 310 has sufficient capacity to store multiple sets of information, and the processor 305 could include a program for alternating or cycling between various sets of display information.

A display 315 is coupled to the processor 305 via a display driver system 318. The display 315 may be a liquid crystal display (LCD) or the like. In this example, the display 715 is a ¼ VGA display with 16 levels of gray scale. The display 315 functions to display data or other information relating to ordinary operation of the handheld terminal and/or mobile companion 300. For example, the display 315 may display a set of customer information, which is displayed to the operator and may be transmitted over a system backbone (not shown). Additionally, the display 315 may display a variety of functions that control the execution of the handheld terminal and/or mobile companion 300. The display 315 is capable of displaying both alphanumeric and graphical characters. Power is provided to the processor 305 and other components forming the handheld terminal and/or mobile companion 300 by at least one battery 320. In the event that the battery(s) 320 fails or becomes disconnected from handheld terminal and/or mobile companion 300, a supplemental power source 323 can be employed to provide power to the processor 305. The handheld terminal and/or mobile companion 300 may enter a minimum current draw of sleep mode upon detection of a battery failure.

The handheld terminal and/or mobile companion 300 includes a communication subsystem 325 that includes a data communication port 328, which is employed to interface the processor 305 with the main computer. The handheld terminal and/or mobile companion 300 also optionally includes an RF section 330 connected to the processor 305. The RF section 330 includes an RF receiver 335, which receives RF transmissions from the main computer for example via an antenna 340 and demodulates the signal to obtain digital information modulated therein. The RF section 330 also includes an RF transmitter 345 for transmitting information to the main computer, for example, in response to an operator input at a operator input device 350 (e.g., keypad, touchscreen) or the completion of a transaction. Peripheral devices, such as a printer 355, signature pad 360, magnetic strip reader 365, and barcode scanner/imager 370 can also be coupled to the handheld terminal and/or mobile companion 300 through the processor 305.

The handheld terminal and/or mobile companion 300 also includes a tamper resistant grid 375 to provide for secure payment transactions. If the handheld terminal and/or mobile companion 300 is employed as payment terminal, it can be loaded with a special operating system. However, if the handheld terminal and/or mobile companion 300 is employed as a general purpose terminal, it can be loaded with a general purpose operating system.

While, for purposes of simplicity of explanation, the methodology of FIG. 9 is shown and described herein as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention In addition, while a particular feature of the invention may have been disclosed with respect to only one of several implementations, such feature may be combined with one or more other features of the other implementations as may be desired and advantageous for any given or particular application. As used in this application, the term "component" is intended to refer to any electronic or mechanical part associated with an electrical device. Furthermore, to the extent that the terms "includes", "including", "has", "having", and variants thereof are used in either the detailed description or the claims, these terms are intended to be inclusive in a manner similar to the term "comprising.

What is claimed is:

1. A mobile terminal, comprising:
    a plastic housing comprising at least one of a transmitter, a receiver, a flex member and an antenna;
    a bar code reader; and
    a component insert-molded as part of the plastic housing such that at least a portion of the component is embedded within the plastic of the plastic housing.

2. The mobile terminal of claim 1, the component comprising an electrical or electronic component.

3. The mobile terminal of claim 1, the component comprising a mechanical component.

4. The mobile terminal of claim 1, the component is insert-molded within the plastic housing.

5. The mobile terminal of claim 1, the component is a flex member insert-molded on a trough of the plastic housing for an electrical or mechanical connection of the plastic housing to other bodies.

6. The mobile terminal of claim 1, the component comprising an interface unit for the electronic device.

7. The mobile terminal of claim 1, the component is completely embedded within the plastic of the plastic housing and has an exposed interconnect pin.

8. The mobile terminal of claim 1, the at least one of the transmitter, the receiver, the flex member and the antenna is insert-molded into the plastic housing.

9. The mobile terminal of claim 1, the antenna receives a frequency corresponding to at least one of a Local Area Network, a Wide Area Network, a Personal Area Network, GSM, DCS, and PCS.

10. The mobile terminal of claim 1, the antenna comprising a set of meandering lines of metal with a geometry that determines signal frequency receptivity.

11. The mobile terminal of claim 10, the set of meandering lines of metal is formed by at least one of an etching and a printing on a dielectric layer.

12. A mobile terminal comprising:

means for reading bar codes;

means for housing the mobile terminal, the means for housing having integrated therewith via insert-molding at least one of a transmitter, a receiver, a flex member and an antenna(s) such that at least a portion of the at least one of the transmitter, the receiver, the flex member and the antenna(s) are embedded within the plastic of a plastic housing.

* * * * *